UNITED STATES PATENT OFFICE.

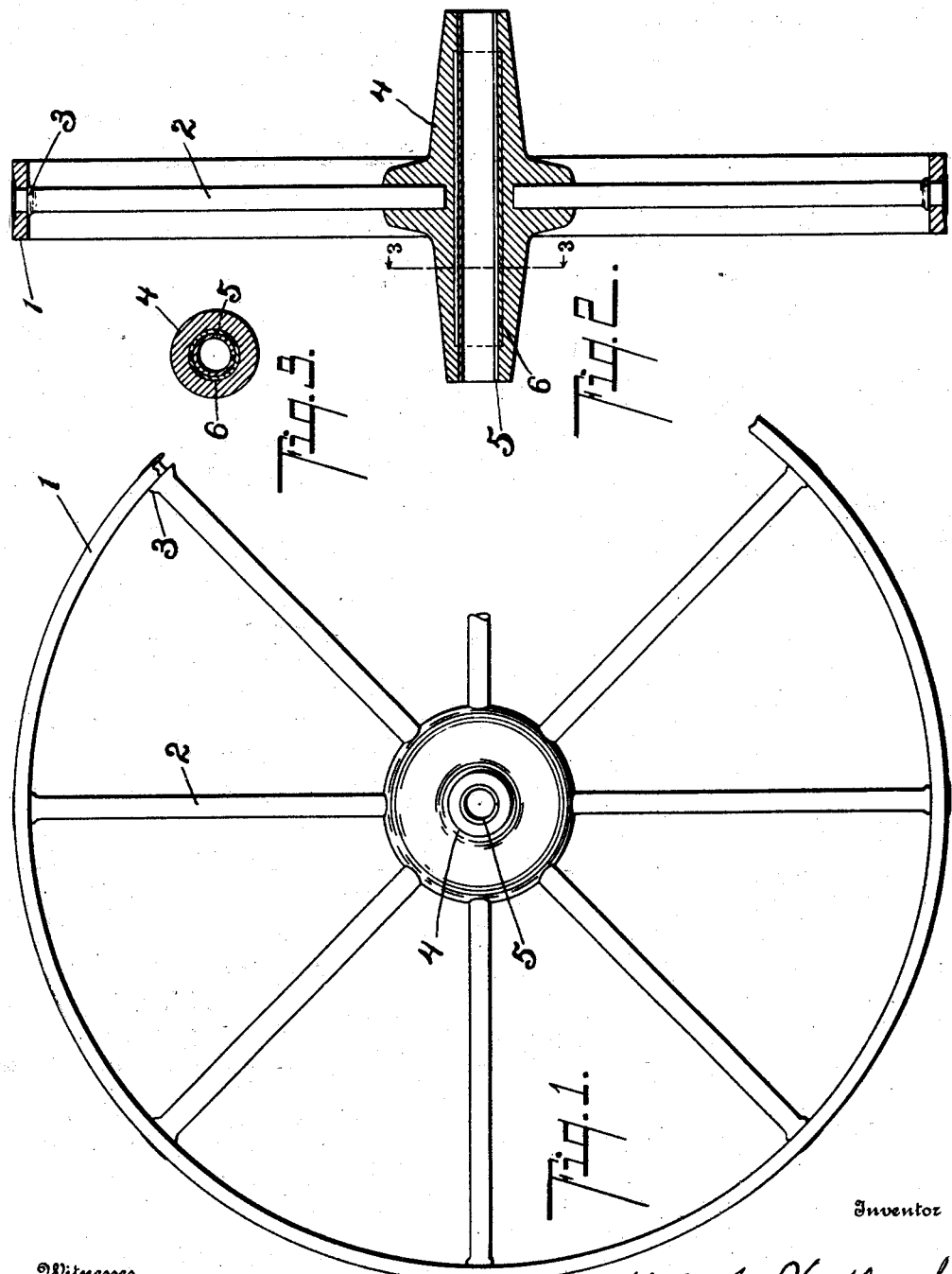

HOLLY M. VERPLANCK, OF LANSING, MICHIGAN, ASSIGNOR TO LANSING WHEELBARROW COMPANY, OF LANSING, MICHIGAN.

WHEEL.

No. 901,568.     Specification of Letters Patent.     Patented Oct. 20, 1908.

Application filed November 30, 1907. Serial No. 404,486.

*To all whom it may concern:*

Be it known that I, HOLLY M. VERPLANCK, a citizen of the United States, residing at Lansing, Michigan, have invented certain new and useful Improvements in Wheels, of which the following is a specification.

This invention relates to improvements in wheels.

My improved wheel is particularly adapted and designed by me as a wheel for wheelbarrows, although it is adapted for various other uses where a metal wheel is desired, such as wheels for agricultural implements and the like.

The main object of this invention is to provide an improved wheel which is very economical to produce and at the same time, a very desirable wheel in that it is strong and rigid and is provided with a steel bushing.

Further objects, and objects relating to structural details will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which:

Figure 1 is a detail elevation of my improved wheel. Fig. 2 is a vertical central section thereof. Fig. 3 is a detail cross-section through the hub, taken on a line corresponding to line 3—3 of Fig. 2 looking in the direction of the little arrows at the end of the section line.

In the drawings, similar reference characters refer to similar parts throughout the several views.

Referring to the drawing, the rim 1 is preferably made of metal. The metal spokes 2 are shouldered at their outer ends, as at 3, and are arranged through the rim and riveted thereto. The hub 4 is cast or molded on the inner ends of the spokes. The hub is provided with a bushing preferably formed of steel tubes 5 and 6, sleeved together. These tubes are preferably formed of pieces of sheet steel rolled up into form and the tubes are arranged together so that they break joints, as clearly appears in Fig. 2. This prevents the molten metal running into the bushing when the hub 4 is cast thereon. The inner tube 5 projects at each end beyond the outer tube so that the metal of the hub engages both tubes, effectively embracing them, the inner tube 5 being preferably flush with the ends of the hub so that the metal is supported throughout the casting.

I preferably cast my improved hub by the use of chills, which are adapted to support and enter the bushing, the chills being illustrated in my application for patent filed concurrently herewith. By thus forming my improved wheel, I secure a very desirable wheel at a comparatively slight cost. I secure a steel bushing by this method, and find that the bushing may be formed of pieces of scrap steel, such as frequently go to waste in a manufacturing plant using sheet steel. The bushing and spokes are secured to the hub so that they become practically integral.

Having thus described my invention, what I claim as new and desire to secure by Letters Patent is:

1. A wheel comprising a rim; metal spokes secured thereto; a hub bushing formed of tubes, said tubes being rolled up from sheet metal, and being sleeved together and arranged to break joints and with the ends of the inner tube projecting from the outer tube; and a cast metal hub molded upon said spokes and bushing.

2. A wheel comprising a rim; metal spokes secured thereto; a hub bushing formed of tubes, said tubes being rolled up from sheet metal and being sleeved together and arranged to break joints; and a cast metal hub molded upon said spokes and bushing.

3. A wheel comprising a rim; metal spokes secured thereto; a hub bushing formed of two tubes sleeved together, the inner tube being longer than the outer so that its ends project therefrom; and a cast metal hub molded upon said spokes and bushing, the ends of said hub embracing and engaging the portions of the inner tube which project from the outer.

In witness whereof, I have hereunto set my hand and seal in the presence of two witnesses.

HOLLY M. VERPLANCK. [L. S.]

Witnesses:
ARTHUR C. STEBBINS,
J. F. NEWMAN.